United States Patent [19]

Groves et al.

[11] Patent Number: 5,457,575
[45] Date of Patent: Oct. 10, 1995

[54] RETRACTING HEAD UP DISPLAY WITH FINE ADJUSTMENT OF COMBINER

[75] Inventors: Doyle J. Groves; Morgan D. Murphy, both of Kokomo, Ind.

[73] Assignee: Delco Electronics Corporation

[21] Appl. No.: 262,425

[22] Filed: Jun. 20, 1994

[51] Int. Cl.⁶ .................................................. G03B 21/28
[52] U.S. Cl. ..................... 359/631; 359/630; 359/632; 359/633; 353/13; 353/14
[58] Field of Search ............................ 359/629, 630, 359/634, 619, 632, 633; 353/11, 12, 13, 14

[56] References Cited

U.S. PATENT DOCUMENTS 5,381,267  6/1995  Woody ................................ 359/630
5,394,203  2/1995  Murphy ................................ 359/630

Primary Examiner—Georgia Y. Epps
Assistant Examiner—Ricky Mack
Attorney, Agent, or Firm—Jimmy L. Funke

[57] ABSTRACT

A combiner is pivotally mounted for movement between an operating position in the line of sight of an operator and a storage position. A sector gear fixed to the combiner engages a slidable rack so that sliding the rack causes pivotal movement of the combiner. A control knob and stem are mounted for rotary movement and translation. A cam rotated by the knob engages followers on the rack to slide the rack upon knob translation or rotation. Knob translation effects movement of the combiner between operating and storage position, and when in operating position, knob rotation effects fine adjustment of the combiner to adjust image position.

5 Claims, 2 Drawing Sheets

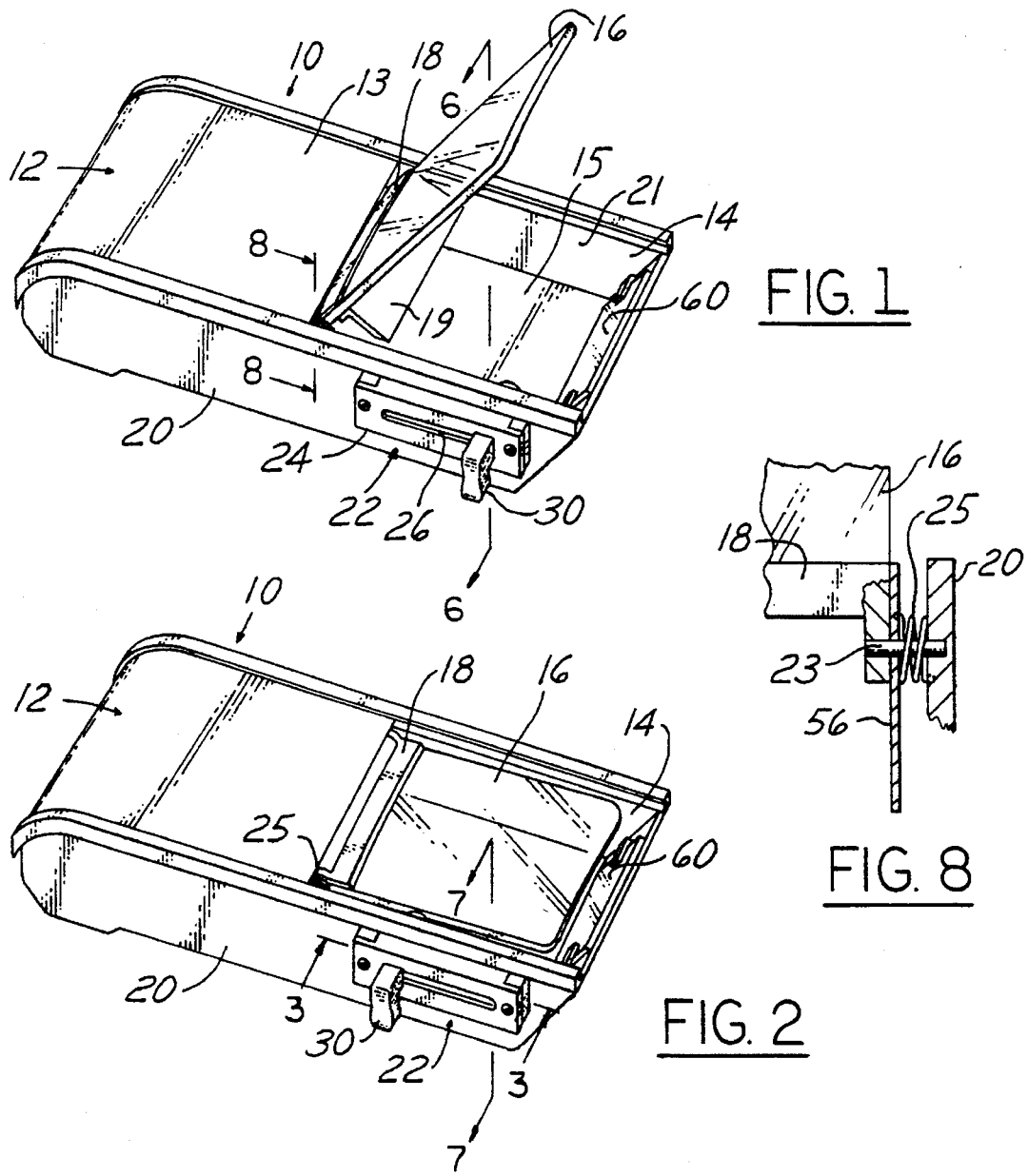
FIG. 1
FIG. 8
FIG. 2
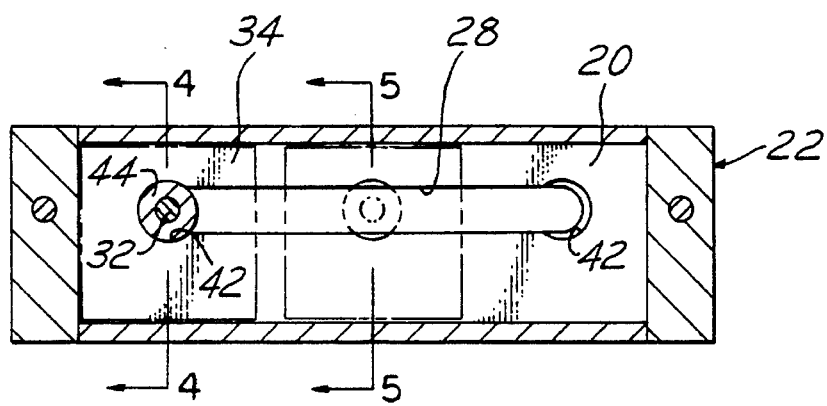
FIG. 3

RETRACTING HEAD UP DISPLAY WITH FINE ADJUSTMENT OF COMBINER

FIELD OF THE INVENTION

This invention relates to a head up display for motor vehicles and particularly to such a display having an adjustable image position when in use and which is retracted when not in use.

BACKGROUND OF THE INVENTION

Head up displays are known for motor vehicle use for displaying speed or other vehicle parameters in or adjacent to the line of sight of the operator to minimize distractions from the roadway view. By projecting a virtual image to the driver the gauge or other information will appear to be outside the vehicle, preferably at about the front of the vehicle. To accomplish this feat, an illuminated image source located beneath the vehicle dash pad is projected onto a reflecting element above the dash pad adjacent the operator view through the windshield. Indeed, the windshield itself is often used as the reflecting element, although windshield curvature introduces image distortions which must somehow be compensated for. It is also known to use a combiner which is a transparent sheet of glass or plastic above the dash pad just behind the windshield, and may be optimally shaped for image reflection, and also allows the roadway to be viewed through it.

Since the image projection requires an opening in the dash pad, it is feasible to retract the combiner when not in use and to restore it to operating position when the HUD is desired. The position of the virtual image for a given optical configuration depends on the eye position of the operator. The image will appear to be higher or lower, depending on the operator's seating height. If the reflecting element is large enough, the image will be visible from a large range of positions. However, to place the image at the position preferred by each operator, the HUD must be adjustable. This has the Side benefit of permitting use of a smaller reflecting element.

SUMMARY OF THE INVENTION

It is therefore an object of the invention to move the HUD reflecting element or combiner to and from storage position by a simple mechanism, and to make adjustments of the image position by the same mechanism.

A HUD housing for mounting on or in a vehicle dash pad supports a transparent combiner which is movable between a storage position in the housing and out of sight of the vehicle operator and an operating position just behind the vehicle windshield and in or adjacent to the operator's line of sight. An image source within the housing produces an illuminated display pattern which is reflected by a fold mirror onto the combiner,:if in operating position. The combiner is shaped to magnify the pattern and to create a virtual image of the pattern for viewing by the operator.

The combiner is carried by a support at its lower edge, the support being pivoted at the housing sides to allow the desired combiner movement. A sector gear on the support is engaged by a slidable rack such that the combiner is moved about the pivot axis by sliding the rack. A control knob for manipulation by the operator is coupled to the rack and is mounted in a guide for linear movement. When the knob is moved from one end of the guide to the other, the combiner is pivoted between storage and operating position. At the operating position the knob is locked against linear movement until released by the operator. The control knob is also able to rotate. It is coupled to the rack by a cam which engages a follower on the rack, so that as the knob is turned, the cam also turns to cause small movements of the rack. The combiner thus is subject to a fine adjustment about the pivot axis, thereby adjusting the position of the image. Accordingly, the operator, by turning the knob can place the display image according to his seating height and personal preference.

BRIEF DESCRIPTION OF THE DRAWINGS

The above and other advantages of the invention will became more apparent from the following description taken in conjunction with the accompanying drawings wherein like references refer to like parts and wherein:

FIGS. 1 and 2 are isometric views of a retractable combiner in operating and stored positions, respectively, for a head up display according to the invention;

FIG. 3 is a cross section of a control mechanism taken along line 3—3 of FIG. 2;

FIG. 8 is a cross section of the combiner pivot arrangement taken along line 8—8 of FIG. 1.

DESCRIPTION OF THE INVENTION

Figure 4:
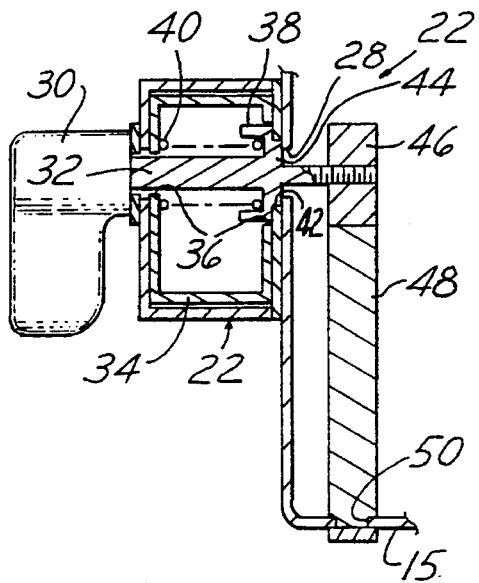
FIGS. 4 and 5 are cross sections of the control mechanism taken along lines 4—4 and 5—5 of FIG. 3.
Figure 5:
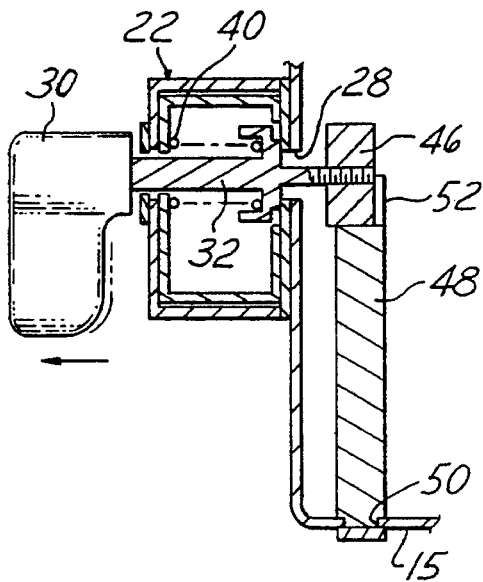

Referring to the drawings, FIG. 1 shows a HUD module 10 for installation in a vehicle dashboard. The module includes a housing 12 having partially enclosed top 13, a rear top opening 14, and a bottom wall 15. A transparent combiner 16 mounted on a support 18, is movable between an operating position, as seen in FIG. 1, or retracted into the opening 14 for storage, as shown in FIG. 2. A light baffle 19 extends from the support perpendicular to the combiner for movement therewith and serves to block extraneous light. The support is pivotally mounted on sides 20 and 21 of the housing by pins 23 (FIG. 8) extending laterally from the support 18. A coiled torsion spring 25 wrapped around the pin 23 biases the support and combiner 16 to operating position, thereby counterbalancing the weight of the combiner.

A control mechanism 22 for manual movement of the combiner includes an outer housing 24 mounted outboard of the module on one side 20. The housing 24 includes a horizontal slot 26 and, as shown in FIGS. 3–7, the side 20 also has a slot 28 aligned with the slot 26. A control knob 30 is mounted on the outer end of a stem 32 which extends through both slots 26, 28 for sliding translation from one end of the slots to the other. A hollow slidable stem guide 34 mounted to slide within the housing 24 has aligned apertures 36 to hold the stem perpendicular to the side 20 and allow axial movement as well. A spring seat 38 is located on the stem within the guide and a coil spring 40 around the stem and between the seat and an outer wall of the guide urges the stem inward. A detent or lock at each end of the stem translation comprises a recess 42 at each end of the slot 28 (best shown in FIG. 3), and an enlarged shoulder 44 on the stem for fitting in either recess 42. The spring 40 biases the stem inwardly to seat the shoulder into a recess. The stem 32 is thus mounted for limited axial motion for engaging (FIG. 4) or disengaging (FIG. 5) the shoulder with either recess. A circular cam 46 is eccentrically mounted on the inner end of the stem for rotation with the stem.

The control mechanism also includes a slide 48 mounted for movement in a slot 50 in the bottom 15 of the housing. The slide has a rear portion with upstanding fingers 52 or cam followers bracketing the cam 46 and a front portion comprising a toothed rack 54. A sector gear 56 depending from the support 18 engages the rack 54 so that as the slide 48 moves forwardly the combiner 16 pivots down toward its storage position (FIGS. 2 and 7), and as the slide moves back the combiner moves up toward the operating position (FIGS. 1 and 6).

Figure 6:
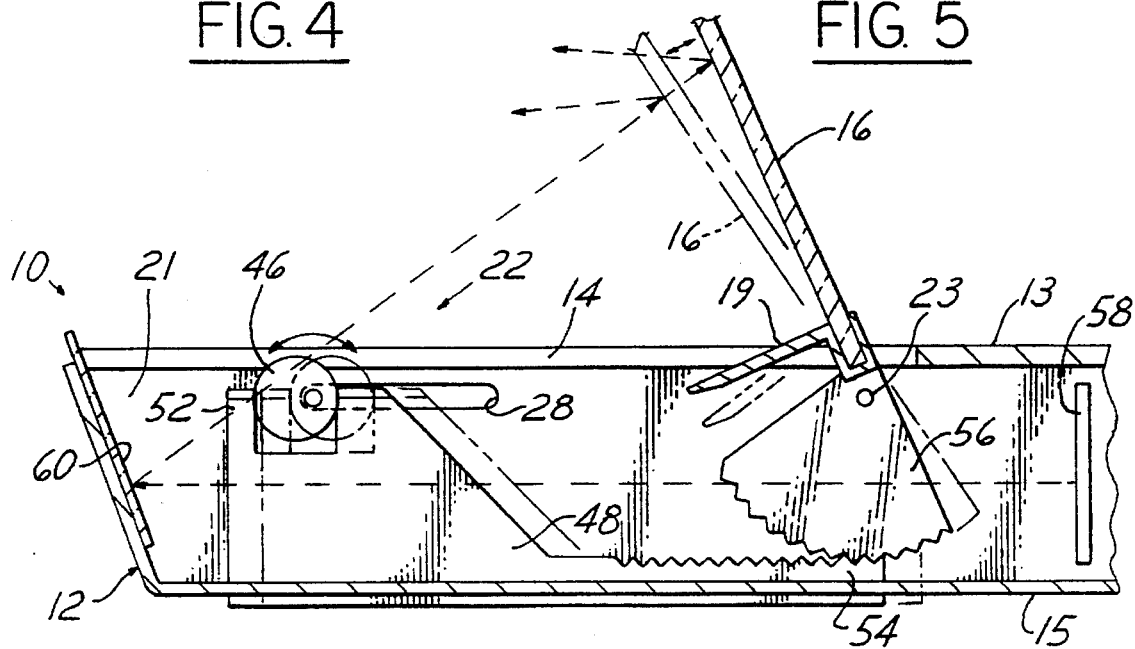
FIGS. 6 and 7 are cross sections of the retractable combiner taken along line 6—6 of FIG. 1 and line 7—7 of FIG. 2, respectively.
Figure 7:
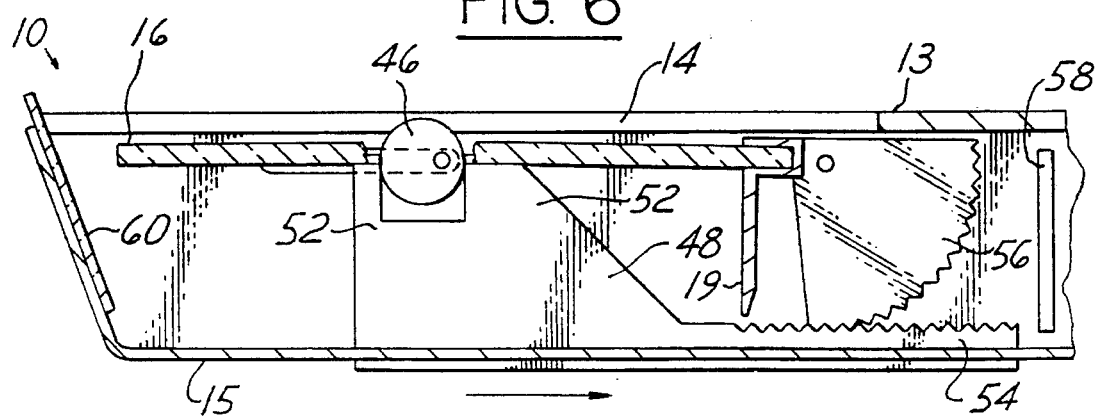

The optical system is best shown in FIG. 6. An image source 58, such as a vacuum fluorescent display, projects the image rearward to a planar fold mirror 60 which is held at a fixed angle to reflect the image toward the combiner 16. The combiner is curved to yield a magnified virtual image somewhere in front of the vehicle. The vertical position of the resulting virtual image depends on the angle of the combiner, which is adjustable as indicated by the phantom line depiction of the combiner.

In operation, movement of the knob 30 from one end of its translational travel to the other moves the slide 48 and the pivoted combiner 16 between storage position and operating position, the lock provision using the recesses 42 serving to hold the combiner in either position until the stem is pulled out by the operator. When locked in operating position, rotating the knob 30 effects rotation of the cam 46 so that small adjustments of the slide 48 and thus of the combiner 16 can be made, as shown in FIG. 6. That adjustment has the effect of shifting the virtual image in the view of the operator.

Thus, in addition to longitudinally shifting the stem to operate the lock, the knob has two degrees of freedom: translation and rotation. The translation effects gross movement of the combiner and the rotation effects fine adjustment, so that a single mechanism can carry out the storage maneuver as well as the image adjustment.

The embodiments of the invention in which an exclusive property or privilege is claimed are defined as follows:

1. In a motor vehicle having an adjustable head up display including a reflecting element for movement between a stored position out of a line of sight of an operator, and an operating position in the line of sight of the operator, comprising:

display means for projecting an image to the reflecting element when in operating position, thereby presenting the image at a position viewable by the operator;

a hinged support bearing the reflecting element; and a manually operated mechanism connected to the hinged support for moving the hinged support and the reflecting element between stored and operating positions, the manually operated mechanism including means for fine adjustment of the hinged support and the reflecting element to adjust the image at an imaging position, wherein the manually operated mechanism further includes an input element with a first degree of freedom for translation and a second degree of freedom for rotation with movement of the input element in the first degree of freedom for translation causing movement of the hinged support and reflecting element between stored and operating positions, and movement of the input element in the second degree of freedom for rotation effecting fine adjustment of the reflecting element when in the operating position.

2. The invention as defined in claim 1 wherein the manually operated mechanism comprises:

a slide element having an output portion connected to the hinged support and an input portion connected to a control knob;

the control knob being mounted for translation to move the hinged support and reflecting element between storage and operating positions;

the control knob further being mounted for rotation and including means for adjusting the slide element upon the control knob rotation to adjust an image position.

3. The invention as defined in claim 2 wherein the means for adjusting the slide element comprises a cam follower on the slide element and a rotary cam engaging the cam follower and coupled to the control knob for moving the slide upon knob rotation.

4. The invention as defined in claim 1 wherein the manually operated mechanism comprises:

a gear secured to the hinged support and a slidable rack engaging the gear for moving the hinged support and the reflecting element;

a manually controlled knob coupled to the slidable rack by a rotary cam;

the control knob being mounted for translation to move the hinged support and reflecting element between storage and operating positions; and the control knob further being mounted for rotation to move the hinged support and reflecting element via rotation of the cam for fine adjustment of the image at an imaging position.

5. The invention as defined in claim 4 including lock means for holding the knob against translation when the reflecting element is in an operating position.

* * * * *